United States Patent
Nichols et al.

(10) Patent No.: US 10,887,161 B1
(45) Date of Patent: Jan. 5, 2021

(54) MULTI-DEVICE INTERFACE APPLICATION

(71) Applicant: Wells Fargo Bank, N.A., San Francisco, CA (US)

(72) Inventors: Tambra Nichols, Charlotte, NC (US); Teresa Lynn Rench, Mount Holly, NC (US); Jonathan Austin Hartsell, Mooresville, NC (US); John C. Brenner, Chesterfield, MO (US); Christopher James Williams, Mooresville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 93 days.

(21) Appl. No.: 15/784,810

(22) Filed: Oct. 16, 2017

(51) Int. Cl.
*H04L 12/24* (2006.01)

(52) U.S. Cl.
CPC .......... *H04L 41/0803* (2013.01); *H04L 41/12* (2013.01)

(58) Field of Classification Search
CPC ............... H04L 67/148; H04L 65/1006; H04L 65/1016; H04L 65/1083; H04L 65/4084; H04L 67/02; H04N 21/234309; H04N 21/23439; H04N 21/2393; H04N 21/25; H04N 21/25866; H04N 21/2668
See application file for complete search history.

(56) References Cited

U.S. PATENT DOCUMENTS

| | | | | |
|---|---|---|---|---|
| 6,587,125 B1 * | 7/2003 | Paroz | ................. | H04L 41/0253 709/201 |
| 7,487,283 B2 * | 2/2009 | Sivertsen | ............. | G06F 13/409 710/301 |
| 8,000,453 B2 | 8/2011 | Cooper et al. | | |
| 8,051,314 B2 * | 11/2011 | Huffman | ............... | G06F 1/3203 713/323 |
| 9,172,747 B2 | 10/2015 | Walters | | |
| 9,471,638 B2 | 10/2016 | Roytman et al. | | |
| 10,048,993 B2 * | 8/2018 | Need | ...................... | G06F 9/542 |
| 2007/0115376 A1 * | 5/2007 | Igarashi | .................. | H04N 9/09 348/262 |
| 2008/0034081 A1 * | 2/2008 | Marshall | ............... | G05B 19/02 709/223 |
| 2011/0217855 A1 * | 9/2011 | Yoshikoshi | ............ | H01R 12/70 439/76.1 |

(Continued)

FOREIGN PATENT DOCUMENTS

WO WO-2002057896 A2 7/2002

OTHER PUBLICATIONS

Kuznar, Damjan, et al., "Virtual Assistant Platform", Informatica: Ljubljana40.3, (Sep. 2016), 285-289.

*Primary Examiner* — Ninos Donabed
(74) *Attorney, Agent, or Firm* — Schwegman Lundberg & Woessner, P.A.

(57) ABSTRACT

Various examples described herein are directed to systems and methods for providing a user interface at a plurality of computing devices. A first interface application executing at a first computing device may determine a first state for a user interface. The first interface application may detect a set of user computing devices for providing the user interface to a user and select a second computing device that is in the set of user computing devices based at least in part on the first state of the user interface. The first interface application may send a description of the user interface to the second computing device.

17 Claims, 9 Drawing Sheets

(56) References Cited

U.S. PATENT DOCUMENTS

| | | | | |
|---|---|---|---|---|
| 2012/0063415 A1* | 3/2012 | Yee | .................... | H04W 36/0022 |
| | | | | 370/331 |
| 2012/0271904 A1* | 10/2012 | Black | ..................... | H04L 67/06 |
| | | | | 709/213 |
| 2013/0055301 A1* | 2/2013 | Hao | .................... | H04H 20/423 |
| | | | | 725/14 |
| 2013/0111039 A1* | 5/2013 | Gomes | ................. | H04W 4/023 |
| | | | | 709/227 |
| 2014/0006496 A1* | 1/2014 | Dearman | ................ | H04L 67/16 |
| | | | | 709/204 |
| 2014/0156854 A1* | 6/2014 | Gaetano, Jr. | ........ | H04L 65/1069 |
| | | | | 709/227 |
| 2014/0244266 A1 | 8/2014 | Brown et al. | | |
| 2014/0245140 A1 | 8/2014 | Brown et al. | | |
| 2015/0009957 A1* | 1/2015 | Yee | .................... | H04W 36/0022 |
| | | | | 370/331 |
| 2015/0363121 A1* | 12/2015 | Jung | ..................... | G06F 3/0617 |
| | | | | 711/154 |
| 2016/0034026 A1* | 2/2016 | Hanayama | ............ | G06F 1/3206 |
| | | | | 713/323 |
| 2016/0057139 A1* | 2/2016 | McDonough | ....... | H04L 63/0861 |
| | | | | 726/6 |
| 2016/0066326 A1* | 3/2016 | Choi | ................. | H04W 72/0453 |
| | | | | 370/329 |
| 2016/0259656 A1* | 9/2016 | Sumner | .................... | G06F 3/167 |
| 2016/0260436 A1 | 9/2016 | Lemay et al. | | |
| 2016/0294790 A1* | 10/2016 | Susan | .................... | H04W 12/04 |
| 2016/0308799 A1 | 10/2016 | Schubert et al. | | |
| 2016/0335532 A1 | 11/2016 | Sanghavi et al. | | |
| 2016/0337971 A1* | 11/2016 | Bhargava | ............ | H04W 28/021 |

* cited by examiner

MULTI-DEVICE INTERFACE APPLICATION

TECHNICAL FIELD

Embodiments described herein generally relate to systems and methods for improved interfacing between a human user and one or more computing devices.

BACKGROUND

User interfaces are provided to users across various different input/output (I/O) mechanisms or channels. For example, visual UI elements may be provided to a user via a display screen or projection device. Audio UI elements may be provided with speakers or microphones. Haptic UI elements may be provided, for example, via vibrations, texture, etc.

DRAWINGS

In the drawings, which are not necessarily drawn to scale, like numerals may describe similar components in different views. Like numerals having different letter suffixes may represent different instances of similar components.

Some embodiments are illustrated by way of example, and not of limitation, in the figures of the accompanying drawings.

DETAILED DESCRIPTION

Figure 1:
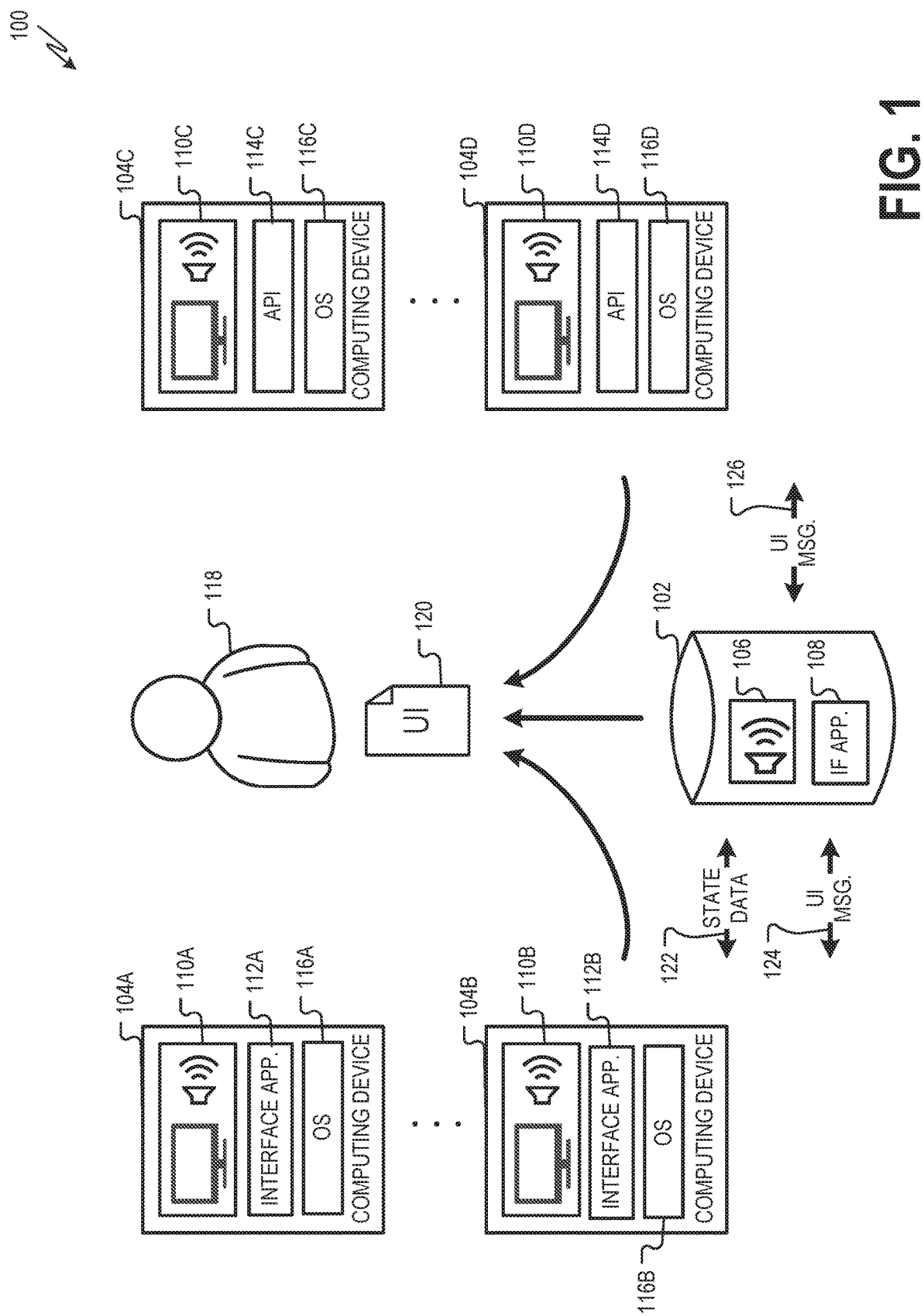
FIG. 1 is a diagram showing one example of an environment for implementing a multi-device interface application.

Various examples described herein are directed to systems and methods for providing a user interface (UI) to a user across multiple computing devices. A first interface application may execute at a first computing device. The first interface application may determine a state of the UI to be provided to a user. The state of the UI may indicate, for example, I/O elements to be included in the UI. I/O elements may include, for example, one or more audio, visual, or other output elements, one or more expected inputs, etc.

The first interface application may also detect a set of one or more computing devices that may be used to provide the UI to the user. For example, the detected set of computing devices may be in the vicinity of the first computing device. The first interface application may select one or more in the set of computing devices to provide the UI to the user, based at least in part on the state of the UI. For example, if the state of the UI includes a large visual output element, such as a detailed graph, the first interface application may select a computing device having a large display screen, such as a smart television. Also, for example, if the state of the UI includes an audio output element that includes providing music, such as classical music, the first interface application may select a computing device having a high-quality speaker or set of speakers, such as a smart entertainment system. In some examples, the first interface application may also select a computing device for providing the UI based on a location of the user. For example, if the user is in their bedroom, the first interface application may select a smart television in the bedroom rather than a smart television in the living room.

The first interface application may transfer all or part of the UI to the selected computing device. In various examples, the first interface application may transfer all or part of the UI to the selected computing device in different ways. For example, some or all of the computing devices in the set of computing devices may execute versions of the interface application. The first interface application may send a UI message to a second interface application executing at the selected computing device. The UI message may include a description of one or more UI elements to be provided to the user and/or received from the user (e.g., if the UI element is an input prompt). The second interface application may provide the UI, as described, to the user utilizing the selected computing device. If the second interface application receives user input, it may provide the user input to the first interface application via a return UI message.

In some examples, the selected computing device may execute an operating system (OS) that supports an application programming interface (API). The first interface application may be programmed to support the API and may send a UI message to the selected computing device via the API. The selected computing device (e.g., the OS or another suitable application) may receive the UI message and provide the described UI elements to the user. Any input received from the user may be provided back to the first interface application, for example, via the API.

In another example, transferring all or part of the UI to the selected computing device by the first interface application includes transferring the functionality of the first interface application to a second interface application executing at the selected computing device. For example, the first interface application may send an application state message to the second interface application. The application state message may include data describing the state of the first interface application including, for example, values for variables used by the first interface application, and one or more databases kept by the first interface application. The second interface application may receive the state message and assume the state of the first interface application. For example, the second interface application may provide the UI, determine the next state of the UI, select a subsequent computing device to provide the UI, etc.

FIG. 1 is a diagram showing one example of an environment 100 for implementing a multi-device interface application 108. The environment 100 includes computing devices 102 and 104A, 104B, 104C, 104D. The computing devices 102 and 104A, 104B, 104C, 104D may include any suitable type of computing devices including, for example, laptop computers, desktop computers, tablet computers, smart speaker devices, smart telephones, wearable computing devices, smart televisions, smart appliances, etc.

One or more of the computing devices 102 and 104A, 104B, 104C, 104D may provide a UI 120 to a user 118. The UI 120 may include one or more I/O elements. I/O elements may include output elements, describing audio, visual, haptic, or other content to be provided to the user 118, as well as input elements describing inputs that are expected to be received. For example, audio output elements may include speech, music, and/or other sounds to be provided to the user 118, for example, via a speaker. Visual output elements may include still or moving images, graphs, etc. provided to the user 118, for example, via a display screen, projector, or other display device. Haptic output elements may include vibrations, texture, etc. provided to the user 118, for example, via an oscillator, keyboard, touchpad, etc.

Input elements may describe input that is expected to be received via the UI 120. For example, one or more output elements may include a prompt for the user 118 to provide input (e.g., an audio output element may speak words asking the user 118 to provide a user name or password, a visual output element may display text prompting the user 118 to select a file for viewing, etc.). An audio input element may be sensed by a microphone or other audio sensor. A visual input element may be sensed by a camera or other visual sensor. For example, an output element of the UI 120 may prompt the user 118 to display a part of their body (e.g., an eye or retina thereof) to be imaged for security and/or authentication purposes. Some input elements may not be associated with a prompting output element. For example, in some configurations, the user 118 may be able to speak or otherwise enter the word "help" to access help with the interface application 108 without the availability of the help function being explicitly noted at the UI 120.

In the example of FIG. 1, the computing device 102 executes an instance of the interface application 108 and includes I/O devices 106. The instance of the interface application 108 executed at the computing device 102 may be of the same version of the other interface applications 112A, 112B described herein, or a different version. The interface application 108 may be executed, for example, at a processor unit of the computing device 102. The I/O devices 106 may include any suitable I/O devices. Although the computing device 102 may be or include any of the computing devices described herein, the example shown in FIG. 1 depicts the computing device 102 as a smart speaker device. Accordingly, the I/O devices 106 may include one or more speakers for providing audio output elements and one or more microphones for receiving audio input elements.

The computing devices 104A, 104B, 104C, 104D also include I/O devices 110A, 110B, 110C, 110D. In various examples, different computing devices 104A, 104B, 104C, 104D include different combinations and types of I/O devices 110A, 110B, 110C, 110D. For example, a smart television may have a large display screen for providing visual output elements. Some smart televisions, however, may lack a microphone for receiving audio input elements. Also, for example, a smart speaker device, such as the computing device 102, may include a speaker and microphone, but may lack a display screen and/or have a small display screen relative to other available computing devices 104A, 104B, 104C, 104D, 102. The interface application 108 may select one or more of the computing devices 104A, 104B, 104C, 104D for providing the UI 120 to the user 118, for example, based on the types of I/O devices 110A, 110B, 110C, 110D available at the respective computing devices 104A, 104B, 104C, 104D, based on the location of the respective computing devices 104A, 104B, 104C, 104D, etc.

Example computing devices 104A, 104B execute versions of the interface application 112A, 112B. The interface applications 112A, 112B may be configured to receive UI messages 124 from the interface application 108. For example, the UI messages 124 may describe all or a portion of the UI 120 to be provided to the user 118. For example, a UI message 124 may include content items such as images, videos, audio files, etc. to be provided to the user 118 as part of the UI 120. In some examples, the interface applications 112A, 112B may receive an input element from the user 118. Input received from the user 118 may be provided back to the interface application 108 via one or more return UI messages 124.

In some examples, in lieu of or in addition to receiving UI messages 124, the interface applications 112A, 112B may be configured to receive state data messages 122 from the interface application 108. A state data message 122 may include state data describing a state of the interface application 108 including, for example, values for variables used by the interface application 108, one or more databases used by the interface application 108, etc. Upon receiving a state data message 122, an interface application 112A, 112B may assume the processing that had previously been performed by the interface application 108. For example, the interface application 108 may cease its execution and/or cease management of the UI 120. The interface application 112A, 112B receiving the state data message 122 may further manage the UI 120, for example, by determining subsequent states of the UI 120 and/or selecting one or more other computing devices 104A, 104B, 104C, 104D, 102 for providing the UI 120.

Example computing devices 104C, 104D may include APIs 114C, 114D. The APIs 114C, 114D may support a set of instructions and/or replies that may be used by a remote system to access the I/O devices 110C, 110D. For example, the computing device 102 may provide UI messages 126 to one or more of the computing devices 104C, 104D. The UI messages 126 may be formatted to be recognized by the APIs 114C, 114D and may instruct the APIs 114C, 114D to provide one or more output elements of the UI 120 to the user 118 utilizing one or more of the I/O devices 110C, 110D. The user 118, in some examples, may also provide input elements to the computing devices 104C, 104D. The APIs 114C, 114D may be programmed to receive input and send return UI messages 126 describing the input to the interface application 108. The computing devices 104A, 104B, 104C, 104D include operating systems (OSs) 116A, 116B, 116C, 116D. The OSs 116A, 116B, 116C, 116D may provide an interface between applications and/or utilities executing at the computing devices 104A, 104B, 104C, 104D (such as the interface applications 112A, 112B and APIs 114C, 114D) and hardware at the computing devices 104A, 104B, 104C, 104D (such as the I/O devices 110A, 110B, 110C, 110D, etc.)

The interface applications 108, 112A, 112B described herein may be executed to provide functionality to the user 118. In some examples, functionality may be provided directly by the interface applications 108, 112A, 112B. For example, the interface applications 108, 112A, 112B may be a web browser application, word processor application, teleconferencing application, or other suitable application that provides the UI 120 to the user 118. In some examples, the interface applications 108, 112A, 112B may facilitate the functionality of other applications executing at the computing device 102 or the computing devices 104A, 104B, 104C,

104D. For example, a web browser, word processor application, teleconferencing application, etc. may execute independently of the interface applications 108, 112A, 112B and may utilize the interface applications 108, 112A, 112B to provide the UI 120 to the user 118.

Any suitable functionality may be provided and/or facilitated by the interface application 108, 112A, 112B. In some examples, the interface application 108, 112A, 112B provides and/or facilitates another application that provides a virtual assistant. A virtual assistant may execute various commands received from the user 118 such as, for example, commands to play music, commands to control household devices (e.g., lights, thermostats, appliances), commands to retrieve information, etc. In some examples, a virtual assistant may provide financial functionality to the user 118. For example, the virtual assistant may include functionality for providing the user 118 with balances or transactions from one or more financial accounts as well as other financial functionality. In some examples, the virtual assistant may permit the user 118 to apply for credit, make a payment, etc.

In some examples, the virtual assistant receives input and provides output in a natural language format. For example, the user 118 may provide audio input describing a command. (E.g., "VA, please find the balance of my checking account.") The virtual assistant may analyze the audio input to derive the included command. The virtual assistant may also provide a natural language output. (E.g., "The balance of your checking account is $X.")

Figure 2:
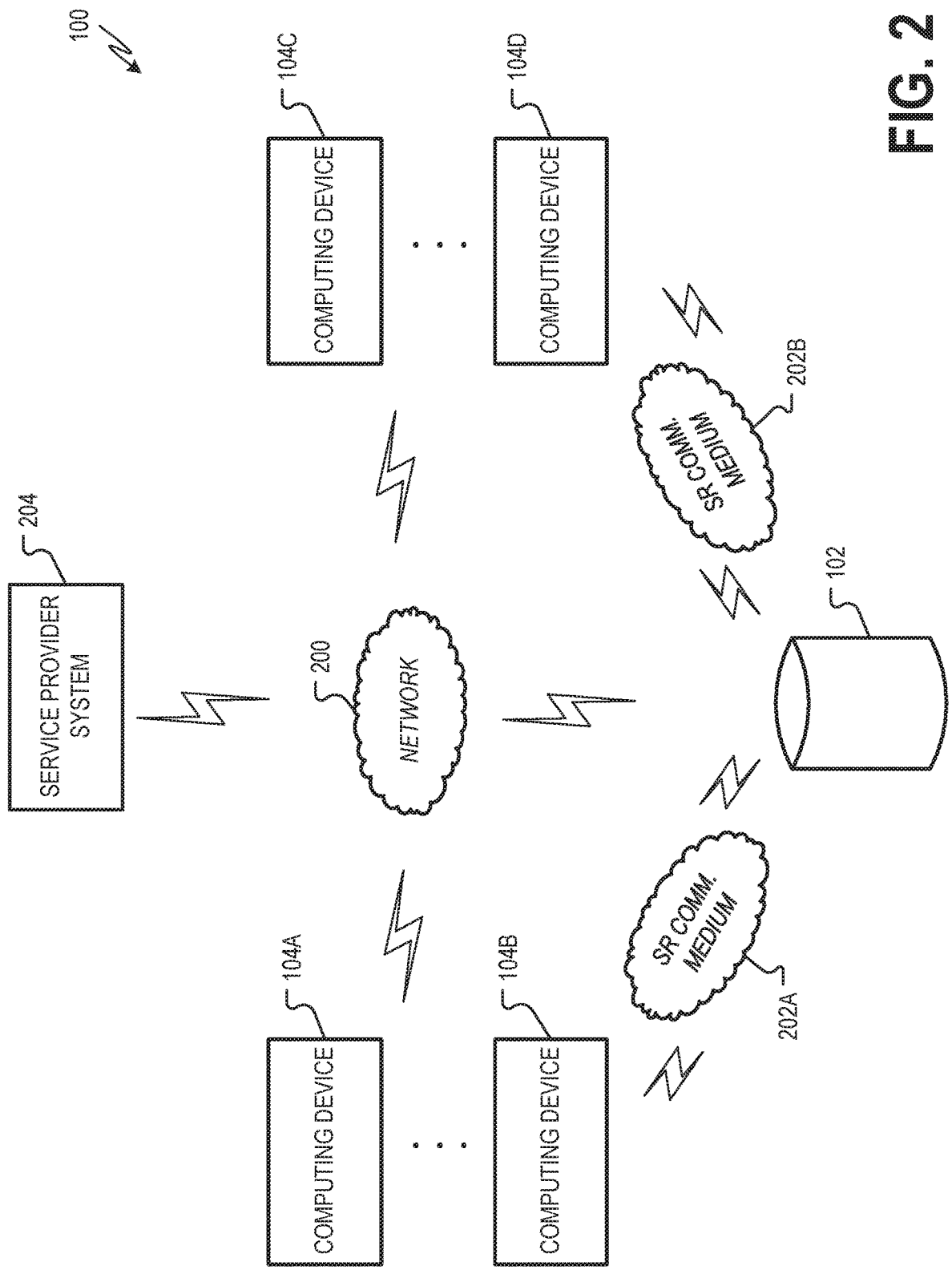
FIG. 2 is a diagram showing another example of the environment of FIG. 1 including additional details.

FIG. 2 is a diagram showing another example of the environment 100 including additional details. In the example of FIG. 2, the computing devices 104A, 104B, 104C, 104D, and 102 are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local-area network (LAN), a wireless LAN (WLAN), a wide-area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

In some examples, some or all of the computing devices 104A, 104B, 104C, 104D, 102 may also be in communication via one or more short-range communication media 202A, 202B. A short-range communication medium 202A, 202B may be a communication medium, for example, wireless, that permits two or more computing devices 104A, 104B, 104C, 104D, 102 that are in physical proximity to one another to communicate. Examples of short-range communication media include Bluetooth® wireless connections, Near Field Communication (NFC) connections, or any other suitable short-range medium via radio frequency (RF), infrared, or other suitable technology. In some examples, a short-range communication medium may permit connectivity over a limited distance. For example, computing devices utilizing infrared short-range communications media may have a direct line of sight from one to the other to allow communication. Depending on conditions, Bluetooth® connections may have a range of about one hundred meters.

FIG. 2 also shows a service provider system 204 in communication with the various other components of the environment 100. The service provider system 204 may include one or more computing devices such as, for example, one or more servers, etc. The service provider system 204 may provide various functionality to the computing devices 102, 104A, 104B, 104C, 104D. For example, the service provider system 204 may track the location of the computing devices 102, 104A, 104B, 104C, 104D. For example, locations for computing devices 102, 104A, 104B, 104C, 104D with fixed locations may be stored at the service provider system 204. Computing devices 102, 104A, 104B, 104C, 104D without fixed locations may report their current location to the service provider system 204. To identify nearby computing devices, a computing device, such as the computing device 102, may request from the service provider system 204 a list of nearby computing devices such as, for example, computing devices 104A, 104B, 104C, 104D within a threshold distance.

Figure 3:
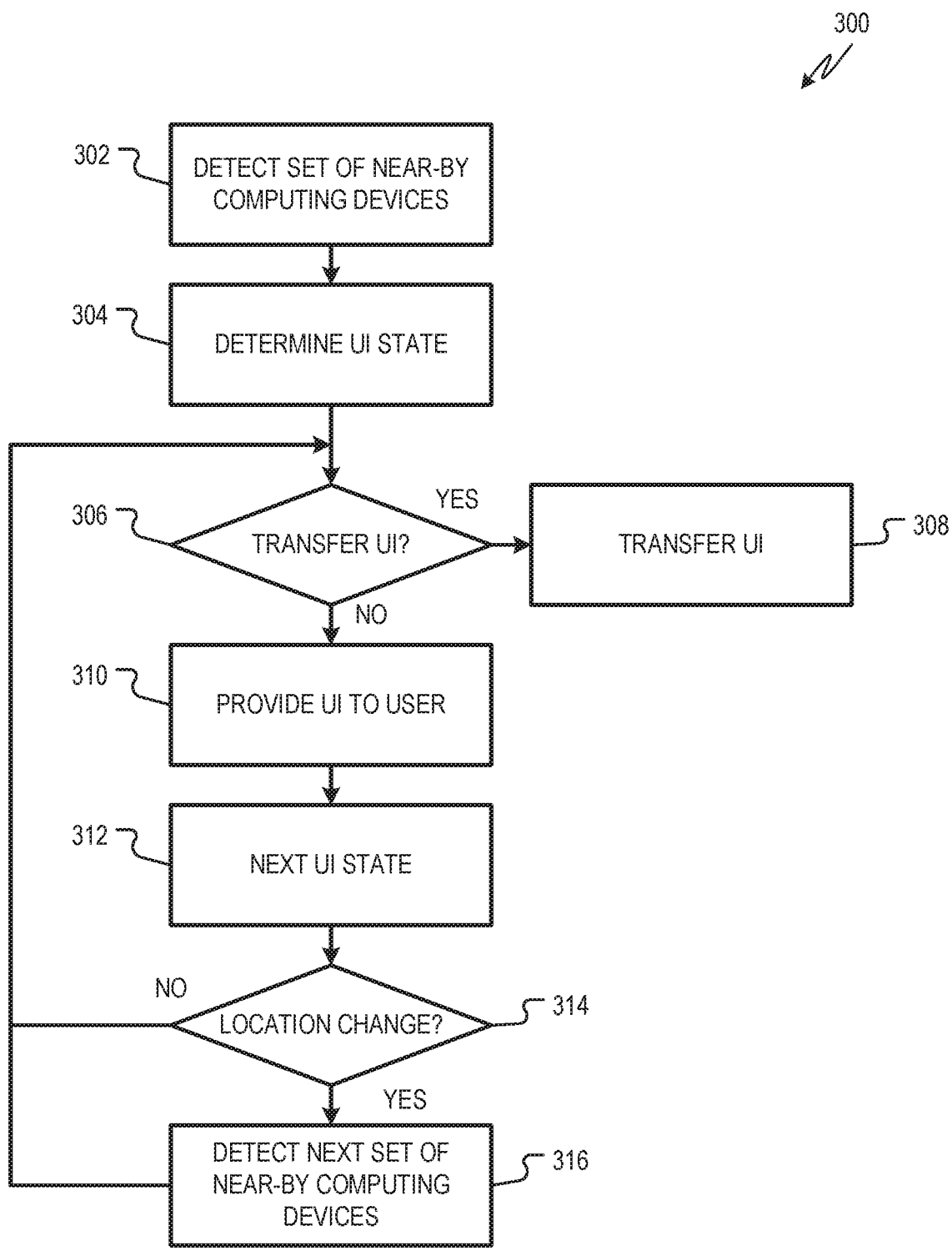
FIG. 3 is a flow chart showing one example of a process flow that may be executed by an interface application to provide a UI to a user utilizing multiple computing devices.

FIG. 3 is a flow chart showing one example of a process flow 300 that may be executed by the interface application 108 of FIG. 1, to provide the UI 120 to the user 118 utilizing multiple computing devices. At operation 302, the interface application 108 may detect a set of nearby computing devices, such as any one or more of the computing devices 104A, 104B, 104C, 104D. The interface application 108 may detect nearby computing devices in any suitable manner. In some examples, the interface application 108, via the computing device 102, may send a broadcast message requesting replies from computing devices 104A, 104B, 104C, 104D within a threshold distance of the computing device 102. The broadcast message may be sent, for example, via a short-range communication medium. In some examples, the interface application 108 may send a message to the service provider system 204 requesting a list of nearby computing devices 104A, 104B, 104C, 104D. In some examples, the service provider system 204 may also provide connection data indicating how the computing device 102 may connect with the nearby computing devices 104A, 104B, 104C, 104D. For a given computing device 104A, 104B, 104C, 104D, connection data may include a network address, such as an Internet Protocol (IP) address, Universal Resource Locator (URL), or other suitable address. Connection data may also indicate, for example, whether the computing device executes an interface application, such as the interface applications 112A, 112B, and/or utilizes an API, such as the APIs 114C, 114D.

In some examples, detecting the set of nearby computing devices 104A, 104B, 104C, 104D may include determining I/O devices 110A, 110B, 110C, 110D of the computing devices 104A, 104B, 104C, 104D including, for example, properties of the I/O devices 110A, 110B, 110C, 110D, such as display size, etc. This may be performed, for example, by querying the computing devices 104A, 104B, 104C, 104D. In some examples, the service provider system 204 may store indications of the I/O devices 110A, 110B, 110C, 110D. The interface application 108 may query the service provider system 204 to receive this information.

At operation 304, the interface application 108 may determine a UI state for the UI 120. The UI state may describe UI elements that are provided to the user 118 by the UI 120 and/or expected to be provided to the UI 120 by the user 118. The UI state may be determined in any suitable manner. In some examples, the UI state may be an initial state of the UI 120. Also, in some examples, the UI state may be determined based on input from the user 118. For example, the UI 120 may include a menu of items for selection. The user 118 may select one of the items. A subsequent UI state may be determined based on the selected item. In some examples, the UI state may be selected based on the I/O devices 106, 110A, 110B, 110C, 110D available at the computing device 102 executing the interface application 108 and/or at the other computing devices 104A, 104B, 104C, 104D. For example, if a large screen is available at the computing device 102 and/or at a nearby device which the interface application 108 and user 118 may access, the interface application 108 may select a detailed graph UI output element. If no such large screen is available, the interface application 108 may select a smaller and/or less detailed UI output element.

At operation 306, the interface application 108 may determine whether to transfer all or part of the UI 120 to another computing device 104A, 104B, 104C, 104D. In some examples, the interface application 108 may determine whether to transfer all or part of the UI 120 based on the UI state determined at operation 304. For example, the interface application 108 may determine if any UI elements of the UI state determined at operation 304 are unsupported by the I/O devices 106 at the computing device 102. A UI element may be unsupported, for example, if the UI element is of a type that the I/O devices 106 do not support. For example, when the computing device 102 is a smart speaker that lacks a screen or projector, a picture, video, or similar visual output element may be unsupported by the I/O device 106. In another example, an input element that involves a user providing spatial input may be unsupported by a computing device 102 that lacks a touchpad, mouse, or other similar pointing device. When a UI element of the UI state is not supported, the interface application 108 may determine to transfer all or part of the UI 120, for example, if a nearby computing device 104A, 104B, 104C, 104D does support the UI element (e.g., includes I/O devices 110A, 110B, 110C, 110D that can provide and/or receive the UI element).

In another example, determining whether to transfer all or part of the UI 120 to another computing device may include determining whether any nearby computing devices 104A, 104B, 104C, 104D include I/O devices 110A, 110B, 110C, 110D that are better suited to one or more UI elements of the UI state. For example, the computing device 102 is a mobile phone with a 5.5 inch display, the user 118 is at home with a smart television, and one of the UI elements is a graph output element. Although the graph output element may be displayed at the display of the computing device 102, the interface application 108 may determine that the smart television is better for providing the UI 120 (and/or the relevant UI element). The interface application 108 may determine whether an I/O device is better suited for a particular UI element in any suitable manner. For example, UI elements may comprise property data describing a preferred I/O device (e.g., device type such as audio, video, etc., device properties such as screen size, etc.). In some examples, the data includes weights for different I/O devices or device properties. The interface application 108 may determine whether any of the nearby computing devices 104A, 104B, 104C, 104D comprise I/O devices that are or include properties weighted higher than those of the current computing device.

In some examples, determining whether to transfer all or part of the UI 120 to another computing device may include determining the current use state of one or more of the nearby computing devices 104A, 104B, 104C, 104D. For example, a smart television computing device may be in use (e.g., a child may be watching their favorite program, a sporting event may be turned on, etc.). The interface application 108 may determine which (if any) nearby computing devices 104A, 104B, 104C, 104D are in use in any suitable manner. For example, the interface application 108 may query the nearby computing devices 104A, 104B, 104C, 104D (e.g., via the interface applications 112A, 112B and/or the APIs 114C, 114D) to determine whether they are in use. Also, in some examples, the computing devices 104A, 104B, 104C, 104D may report their use state to the service provider system 204. The interface application 108 may query the service provider system 204 to receive the use states of the nearby computing devices 104A, 104B, 104C, 104D. The use state of a nearby computing device 104A, 104B, 104C, 104D may be considered in any suitable way. In some examples, if a nearby computing device 104A, 104B, 104C, 104D is in use, the interface application 108 may not transfer all or part of the UI 120 to that device. In other examples, the interface application 108 may transfer all or part of the UI 120 to a computing device in use, but may consider, for example, a priority of the use of the computing device, a priority of the UI 120, etc.

If the interface application 108 determines at operation 306 to transfer all or part of the UI 120 to a nearby computing device 104A, 104B, 104C, 104D, it may execute the transfer at operation 308. All or part of the UI 120 may be transferred in any suitable manner. For example, the interface application 108 and the selected computing device 104A, 104B, 104C, 104D may exchange one or more UI messages 124, 126 as described herein. Also, in some examples, the interface application 108 may send state data messages 122 to the selected computing device 104A, 104B, 104C, 104D, which may cause the selected computing device 104A, 104B, 104C, 104D to assume management of the UI 120. Example methods for transferring some or all of the UI 120 to a selected computing device 104A, 104B, 104C, 104D are provided herein, for example, with reference to FIGS. 5 and 6.

If the interface application 108 determines not to transfer all or part of the UI 120, it may provide the UI 120 to the user 118 at operation 310. For example, the interface application 108 may provide one or more output elements and/or receive one or more input elements from the user 118 at the I/O devices 106 of the computing device 102. At operation 312, the interface application 108 may proceed to a next UI state for the UI 120. The next UI state may include UI elements, such as output elements and/or input elements. In some examples, the UI elements included at the next UI state may be determined based on input elements received from the user 118. For example, an output element may be in response to a request from the user 118. Also, for example, an input element may be indicated by a previous response from the user 118.

At operation 314, the interface application 108 may determine if the location of the user 118 has changed. This may be accomplished in any suitable manner. For example, the computing device 102 may include a sensor for detecting the location of the user 118, such as a camera, LIDAR, proximity detector, etc. If the sensor indicates that the location of the user 118 has changed, the interface application 108 may determine that the user 118's location has changed. In some examples, the computing device 102 may include an audio sensor, such as a microphone. If the volume of the user 118's voice is reduced, the interface application 108 may determine that the user 118's location has changed. In some examples, the computing device 102 may comprise a directional audio sensor, camera, or other suitable sensor for determining a new location for the user 118.

In some examples, the interface application 108 may determine that the user 118's position has changed by detecting a change in the position of the computing device 102 itself. For example, the computing device 102 may be a mobile phone, a wearable, or another device that the user 118 carries with him or her. Also, in some examples, the user 118 may deliberately move the computing device 102. For example, when the computing device 102 is a smart speaker device, the user 118 may move the smart speaker device from one room to the next as they walk through the house, etc.

If the interface application 108 does not detect a change in the location of the user 118, it may proceed to operation 306 and determine whether to transfer some or all of the UI 120 to one of the set of nearby computing devices determined at operation 302. If the interface application 108 detects a change in the location of the user 118, the interface application 108 may detect a next set of nearby computing devices at operation 316. This may be performed, for example, in a manner similar to that described above with respect to operation 302, albeit at the user 118's new location. The method 300 may then proceed to operation 306 and determine whether to transfer all or part of the UI 120 to one or more of the next set of nearby computing devices.

Figure 4:
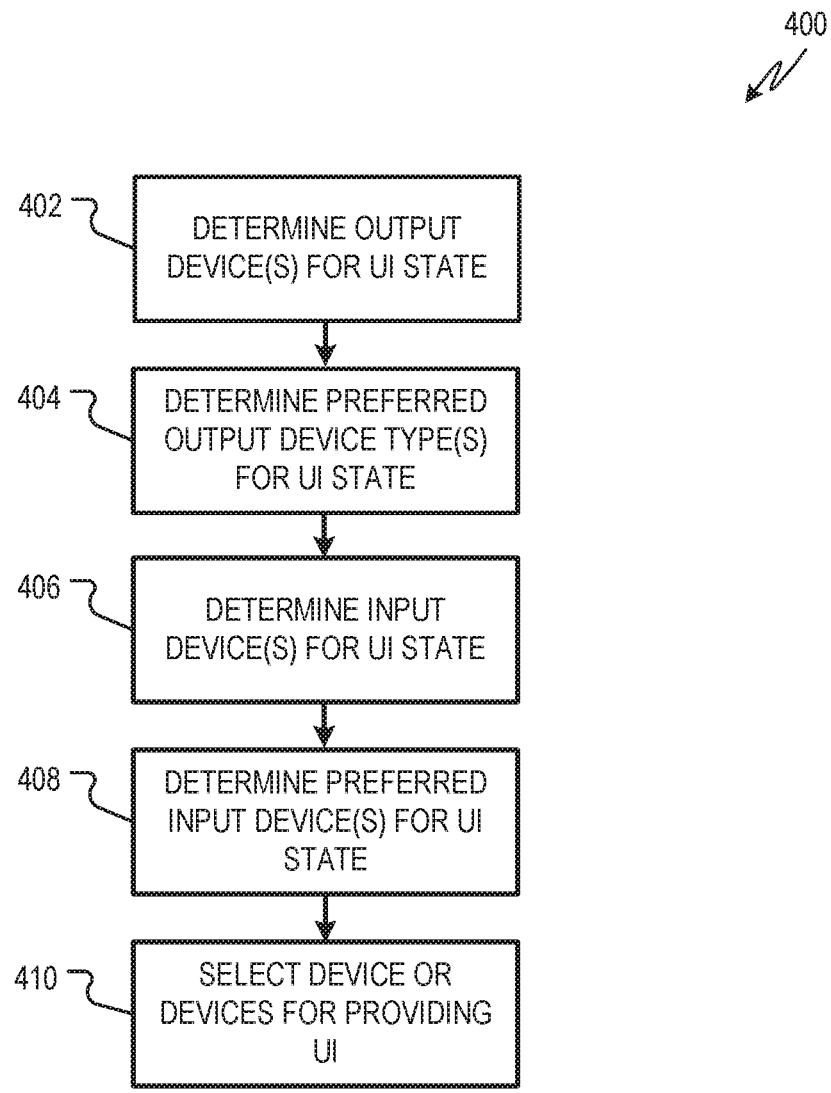
FIG. 4 is a flow chart showing one example of a process flow that may be executed by an interface application to determine whether to transfer all or part of a UI to a recipient computing device.

FIG. 4 is a flow chart showing one example of a process flow 400 that may be executed by the interface application 108, for example, to determine whether to transfer all or part of the UI 120 to a nearby computing device 104A, 104B, 104C, 104D. For example, the process flow 400 shows one example way that the interface application 108 may perform the operation 306 of the process flow 300. For example, the interface application 108 may execute the process flow 400 for a UI state, which may include one or more UI elements such as output elements and/or input elements.

At operation 402, the interface application 108 may determine an output device or devices for providing the output elements indicated by the UI state. For example, if the UI state includes a visual output element, the output devices for providing the UI state may include a screen, projector, or other suitable UI device for providing visual output elements. If the UI state includes an audio output element, the output devices for providing the UI state may include a speaker, speaker system, etc. If the UI state includes a haptic output element, the output devices for providing the UI state may include an oscillator or other suitable device.

At operation 404, the interface application 108 may determine preferred output devices for the UI state. For example, one or more of the output elements of the UI state, although capable of being provided on one type of output device, may be better provided on another. For example, a visual output element including a detailed graph may be provided by the relatively small screen of a mobile phone. The graph may be better provided, however, at the big screen of a smart television. Similarly, a larger screen may also be preferred for a high-resolution video. In another example, an audio output element that includes all or part of a symphony may be provided by any mono speaker system, but may also sound better to the user 118 if provided at a higher-quality speaker system. Preferred output devices for the UI state may be determined, for example, based on UI elements included in the UI state. For example, as described above, different UI elements may be associated with preferred I/O device properties, which may be described by a weight. A preferred output device may be an output device at a nearby computing device that is the best match for the combination of UI elements at the UI state. A result of the operation 404 may include a ranking of different types of the output devices for the UI state.

At operation 406, the interface application 108 may determine an input device or devices for receiving input elements indicated by the UI state. The input elements indicated by the UI state may include, for example, input elements that are specifically solicited by one or more output elements and/or input elements that may be provided without solicitation. The devices for receiving the input elements may include, for example, a microphone, a camera, a fingerprint sensor, etc. For example, if an input element calls for a voice command or other voice information, the input device or devices for the UI state may include a microphone or other audio sensor. In another example, if an input element calls for a retina scan, the input device or devices for the UI state may include a camera or other suitable scanning device, etc.

At operation 408, the interface application 108 may determine preferred input devices for the UI state. For example, some input elements may be better received by one type of input device than by another. For example, it may be preferred to receive a biometric input element as a fingerprint received by a fingerprint sensor. The biometric input element, alternatively, however, may be received as a retina scan or facial recognition performed on an image captured by a camera input device.

At operation 410, the interface application 108 may select a computing device or devices for providing the UI 120 based at least in part on the I/O devices determined at operations 402, 404, 406, 408. In some examples, the interface application 108 may select a single computing device (e.g., the computing device 102 and/or one of the nearby computing devices 104A, 104B, 104C, 104D) that includes all or most of the I/O devices for providing the UI state. If that is the computing device 102, the interface application 108 may determine not to transfer the UI 120. If more than one computing device 102, 104A, 104B, 104C, 104D includes all or most of the I/O devices for providing the UI state, the interface application 108 may select a computing device 102, 104A, 104B, 104C, 104D for providing the UI 120, for example, considering which computing device 102, 104A, 104B, 104C, 104D comprises more preferred I/O devices or device types.

Also, in some examples, the interface application 108 may select more than one computing device 102, 104A, 104B, 104C, 104D for providing the UI 120. This may include, for example, determining to transfer just part of the UI 120 to another computing device 104A, 104B, 104C, 104D. For example, the interface application 108 may select the most preferred I/O device for one or more of the UI elements. UI elements for which the most preferred I/O device is not at the computing device 102 may be transferred, while other UI elements are provided at the computing device 102.

Figure 5:
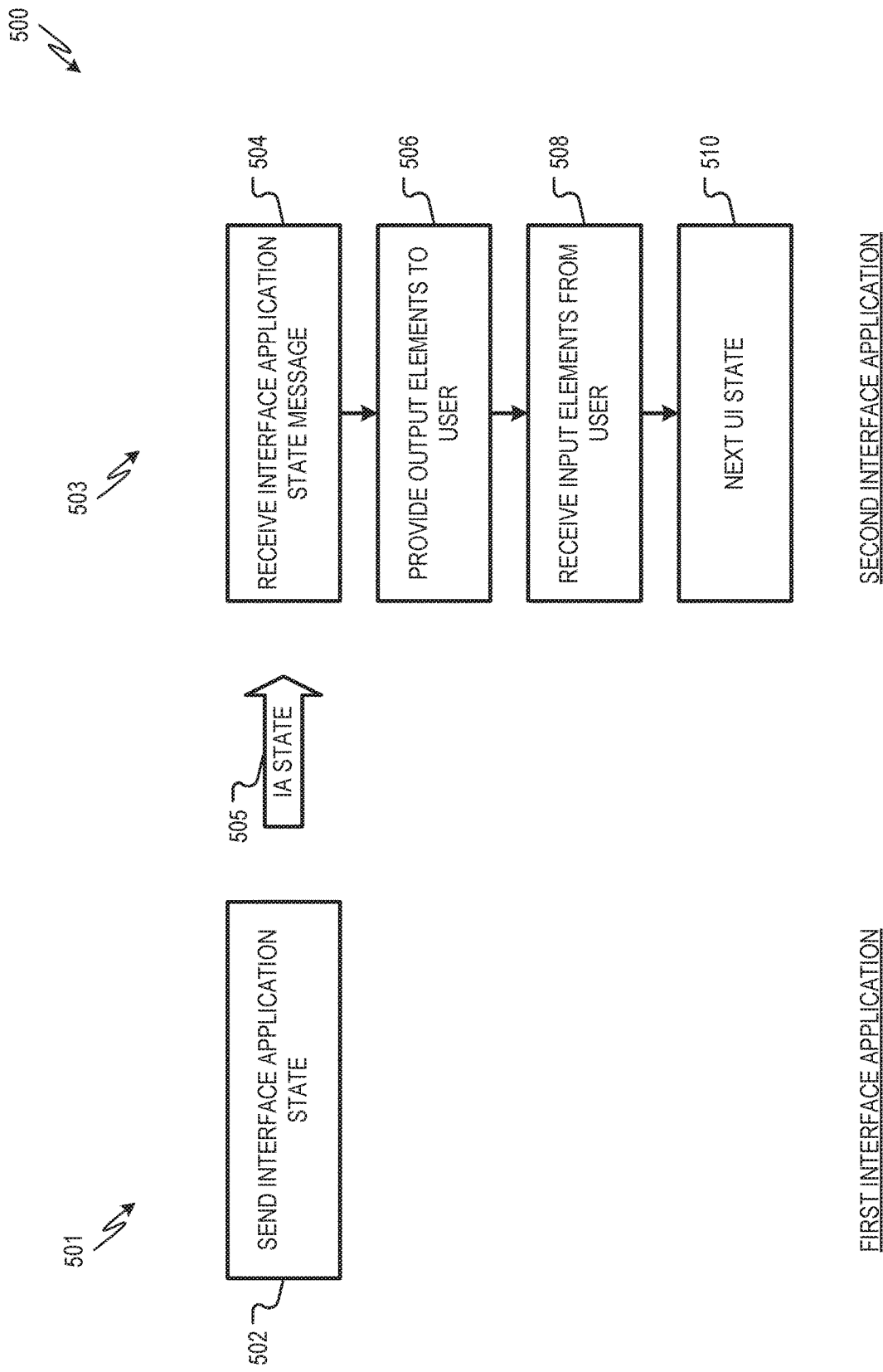
FIG. 5 is a flowchart showing one example of a process flow that may be executed by an interface application to transfer a UI to a recipient computing device.

FIG. 5 is a flowchart showing one example of a process flow 500 that may be executed to transfer a UI, such as the UI 120, to a recipient computing device, which may, for example, be one of the computing devices 104A, 104B. For example, the process flow 500 shows one way that the interface application 108 may perform the operation 308 of the process flow 300. FIG. 5 includes two columns 501 and 503. Operations described in column 501 may be executed by a first interface application, which may be the interface application 108 executing at the computing device 102, for example. Operations described in column 503 may be executed by a second interface application executing at the recipient computing device. For example, the operations in column 503 may be executed by the interface application 112A, 112B at the computing device 104A, 104B.

FIG. 5 shows an example where the interface application 108 transfers control of the UI 120 to the recipient computing device. In some examples, the process flow 500 may be executed when the recipient computing device executes an interface application, such as the computing devices 104A, 104B that execute the interface applications 112A, 112B. For example, after execution of the process flow 500, further UI states of the UI 120 may be determined and administered (e.g., as described herein) by the interface application 112A, 112B executing at the recipient computing device 104A, 104B.

At operation 502, the first interface application may send an interface application state message 505 to the second interface application. The interface application state message 505 may describe a state of the first interface application including, for example, values of variables being used by the first interface application, etc. For example, the first interface application may have displayed a input UI element, such as a slider bar, elevator, etc. The values of variables being used by the first interface application may include positions for the slider bar, elevator, etc. In some examples, the state of the first interface application described by the interface application state message 505 may include a UI state determined by the first interface application.

The second interface application may receive the interface application state message 505 at operation 504. At operation 506, the second interface application may provide UI output elements (e.g., of the UI state) to the user (e.g., the user 118). This may include, for example, utilizing one or more I/O devices of the recipient computing device, such as the I/O devices 110A, 110B. At operation 508, the second interface application may receive UI input elements (e.g., of the UI state) from the user. At operation 510, the second interface application may determine a next UI state for the UI, for example, in a manner similar to that described above with respect to operation 312 of the process flow 300. In some examples, the second interface application may continue to administer the UI, for example, in a manner similar to that described with respect to the process flow 300.

Figure 6:
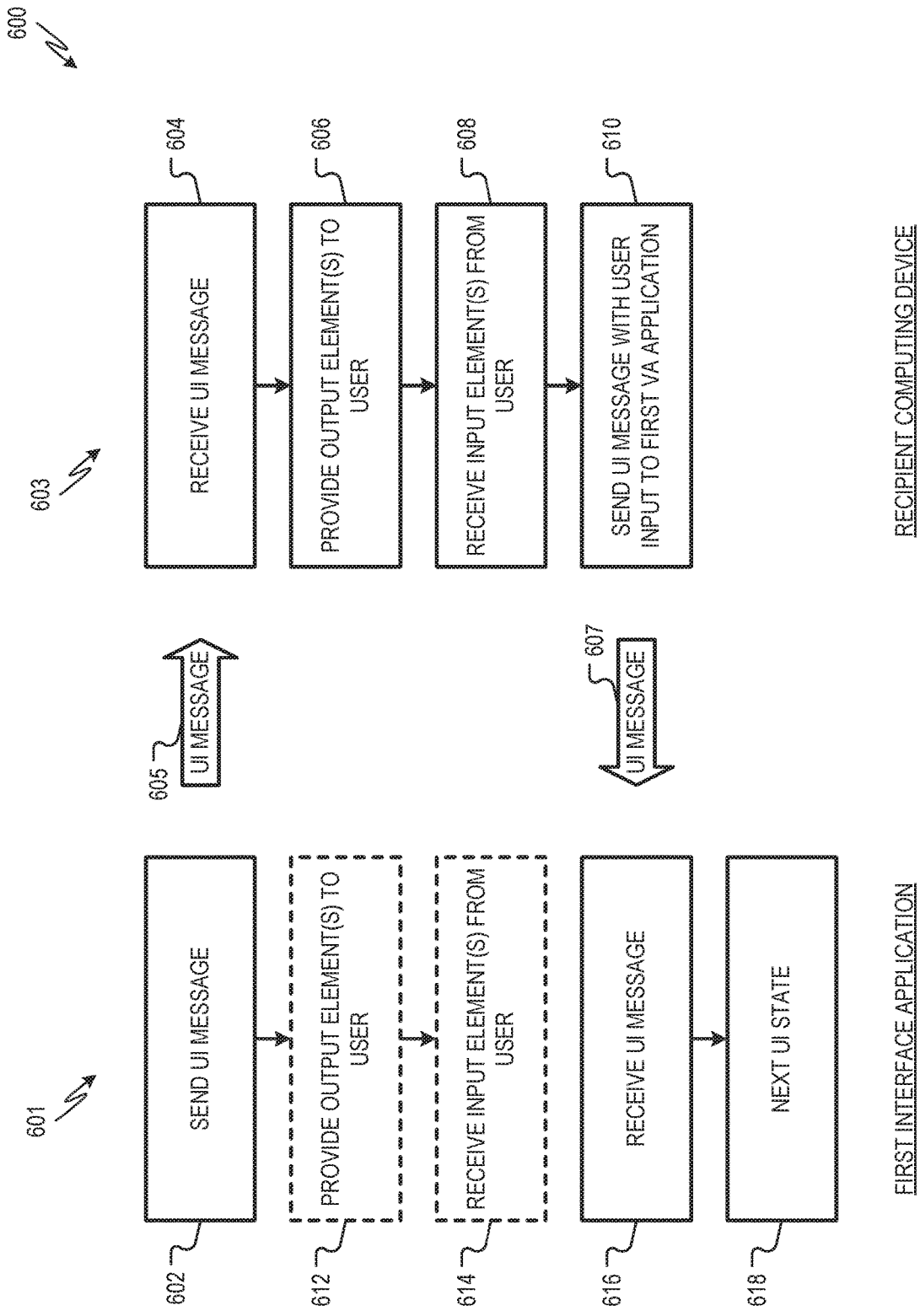
FIG. 6 is a flowchart showing one example of a process flow that may be executed to transfer a portion of a UI (e.g., one or more UI elements) to a recipient computing device.

FIG. 6 is a flowchart showing one example of a process flow 600 that may be executed to transfer a portion of a UI (e.g., one or more UI elements) to a recipient computing device. For example, the process flow 600 shows another example way that the interface application 108 may perform the operation 308 of the process flow 300. In the process flow 600, the first interface application (e.g., the interface application 108) retains control of the UI and uses the recipient computing device to provide one or more UI elements to the user 118.

Like FIG. 5, FIG. 6 also includes two columns 601 and 603. Column 601 includes operations that may be executed by a first interface application, such as the interface application 108. Column 603 includes operations that may be executed at the recipient computing device. Different components at the recipient computing device may execute the operations at column 603, for example, depending on the configuration of the recipient computing device. For example, if the recipient computing device executes a version of the interface application 112A, 112B, like computing devices 104A, 104B, operations in column 603 may be executed by the version of the interface application 112A, 112B. In examples where the recipient computing device comprises an API 114C, 114D, operations in column 603 may be executed by the API 114C, 114D.

At operation 602, the first interface application may send a UI message 605 to the recipient computing device. The UI message 605 may include a description of one or more UI elements to be provided to the user and/or received from the user by the recipient computing device. The recipient computing device may receive the UI message 605 at operation 604. At operation 606, the recipient computing device may provide the output element or elements described by the UI message 605 (if any) to the user. At operation 608, the recipient computing device may receive the input element or elements described by the UI message 605 (if any) from the user. At operation 610, the recipient computing device may send a reply UI message 607 back to the first interface application. The reply UI message 607 may include input received from the user from an input element received at operation 608.

The first interface application may receive the UI message 607 at operation 616 and, at operation 618, the first interface application may determine the next UI state, for example, as described herein. Optionally, the first interface application may provide and/or receive one or more UI elements in parallel with those provided and/or received by the recipient computing device. For example, at optional operation 612, the first interface application may provide one or more output elements to the user, for example, utilizing I/O devices at the computing device executing the first interface application. At optional operation 614, the first interface application may receive one or more input elements from the user, for example, utilizing I/O devices at the computing device executing the first interface application. Determining the next UI state at operation 618, in some examples, is based on UI elements provided at the recipient computing device and on UI elements provided at the first interface application.

Figure 7:
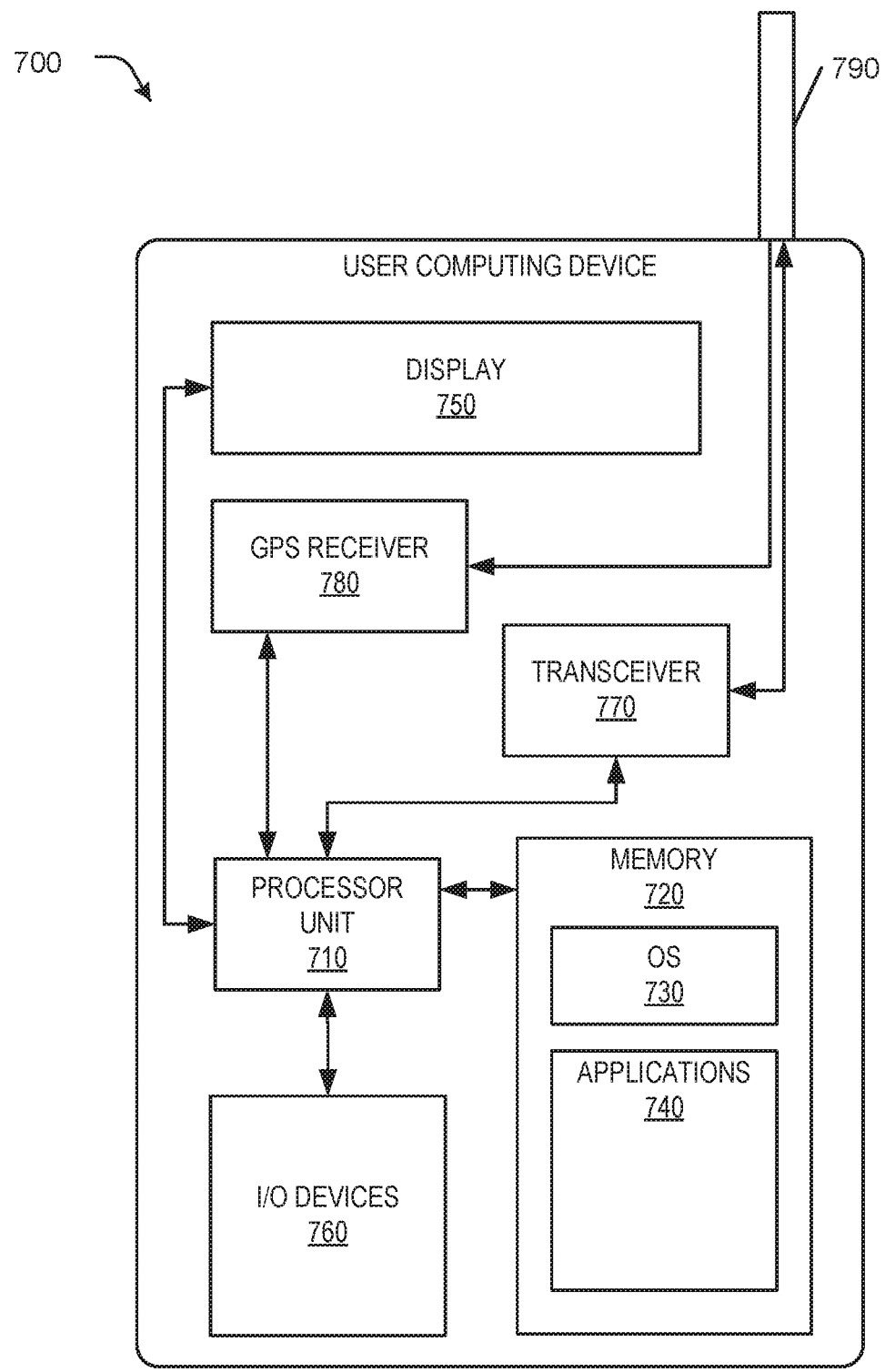
FIG. 7 is a block diagram showing an example architecture of a user computing device.

FIG. 7 is a block diagram showing an example architecture 700 of a user computing device. The architecture 700 may, for example, describe any of the computing devices described herein, including, for example, the computing devices 102, 104A, 104B, 104C, 104D. The architecture 700 comprises a processor unit 710. The processor unit 710 may include one or more processors. Any of a variety of different types of commercially available processors suitable for computing devices may be used (for example, an XScale architecture microprocessor, a Microprocessor without Interlocked Pipeline Stages (MIPS) architecture processor, or another type of processor). A memory 720, such as a Random Access Memory (RAM), a flash memory, or another type of memory or data storage, is typically accessible to the processor unit 710. The memory 720 may be adapted to store an operating system (OS) 730, as well as application programs 740. In some examples, the memory 720 may also store data describing voices including, for example, data describing a set of known voices, data describing unknown ambient voices that have been indicated at an audio sensor, etc.

The processor unit 710 may be coupled, either directly or via appropriate intermediary hardware, to a display 750 and to one or more input/output (I/O) devices 760, such as a keypad, a touch panel sensor, a microphone, and the like. Such I/O devices 760 may include a touch sensor for capturing fingerprint data, a camera for capturing one or more images of the user, a retinal scanner, or any other suitable devices. The I/O devices 760 may be used to implement I/O channels, as described herein. In some examples, the I/O devices 760 may also include sensors.

Similarly, in some examples, the processor unit 710 may be coupled to a transceiver 770 that interfaces with an antenna 790. The transceiver 770 may be configured to both transmit and receive cellular network signals, wireless data signals, or other types of signals via the antenna 790, depending on the nature of the computing device implemented by the architecture 700. Although one transceiver 770 is shown, in some examples, the architecture 700 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a Global Positioning System (GPS) receiver 780 may also make use of the antenna 790 to receive GPS signals. In addition to or instead of the GPS receiver 780, any suitable location-determining sensor may be included and/or used, including, for example, a Wi-Fi positioning system. In some examples, the architecture 700 (e.g., the processor unit 710) may also support a hardware interrupt. In response to a hardware interrupt, the processor unit 710 may pause its processing and execute an interrupt service routine (ISR).

Figure 8:
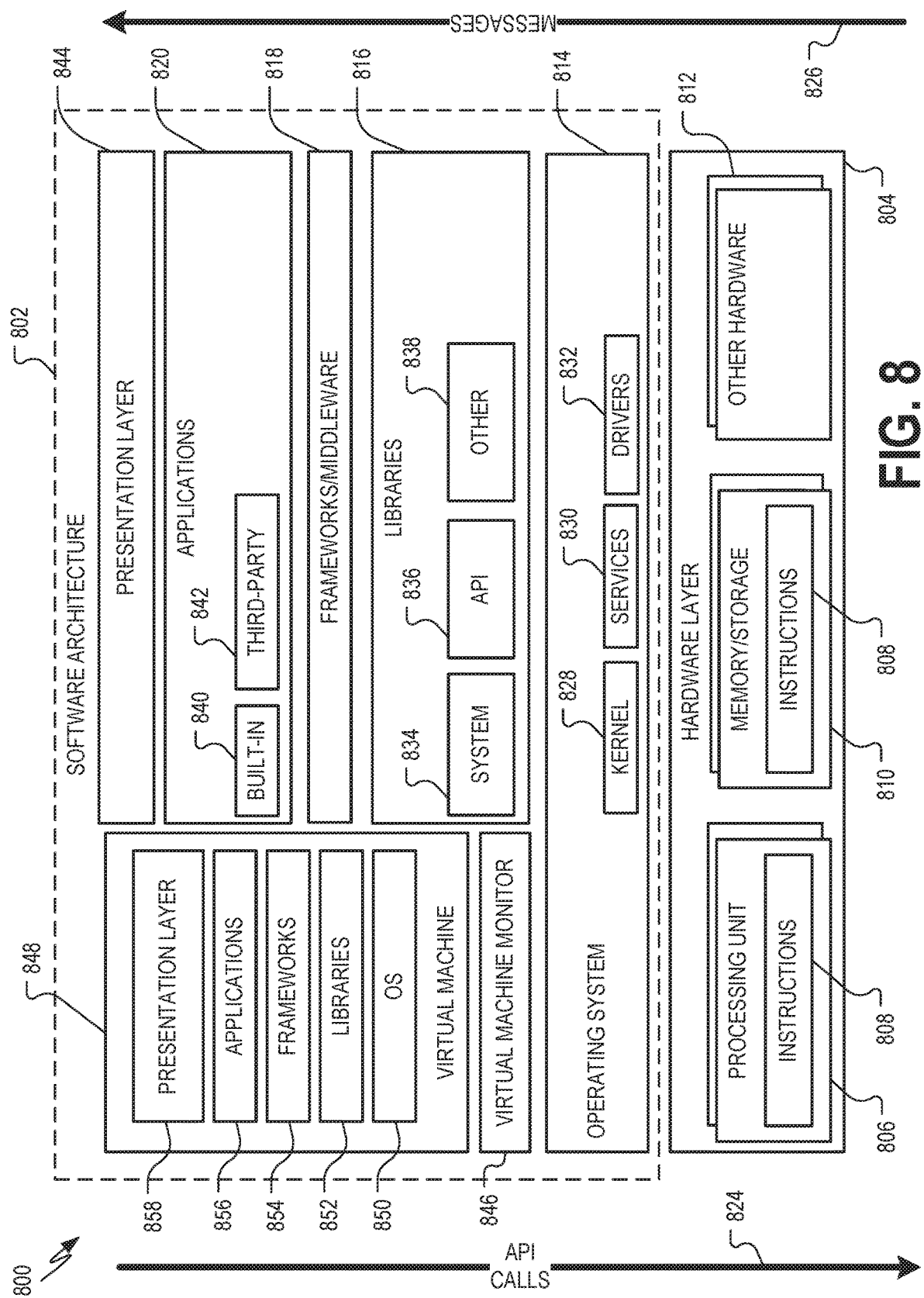
FIG. 8 is a block diagram showing one example of a software architecture for a computing device.

FIG. 8 is a block diagram 800 showing one example of a software architecture 802 for a computing device. The software architecture 802 maybe used in conjunction with various hardware architectures, for example, as described herein. FIG. 8 is merely a non-limiting example of a software architecture 802 and many other architectures may be implemented to facilitate the functionality described herein. A representative hardware layer 804 is illustrated and can represent, for example, any of the above-referenced computing devices. In some examples, the hardware layer 804 may be implemented according to an architecture 900 of FIG. 9 and/or the architecture 700 of FIG. 7.

The representative hardware layer 804 comprises one or more processing units 806 having associated executable instructions 808. The executable instructions 808 represent the executable instructions of the software architecture 802, including implementation of the methods, modules, components, and so forth of FIGS. 1-6. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the architecture 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke API calls 824 through the software stack and receive a response, returned values, and so forth illustrated as messages 826 in response to the API calls 824. The layers illustrated are representative in nature and not all software architectures have all layers. For example, some mobile or special-purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of a hardware or software interrupt and, in response, cause the software architecture 802 to pause its current processing and execute an ISR when an interrupt is received. The ISR may generate an alert.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphical user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. The third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, and/or drivers 832), libraries (e.g., system libraries 834, API libraries 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 8, this is illustrated by a virtual machine 848. A virtual machine creates a software environment where applications/modules can execute as if they were executing on a hardware computing device. The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Figure 9:
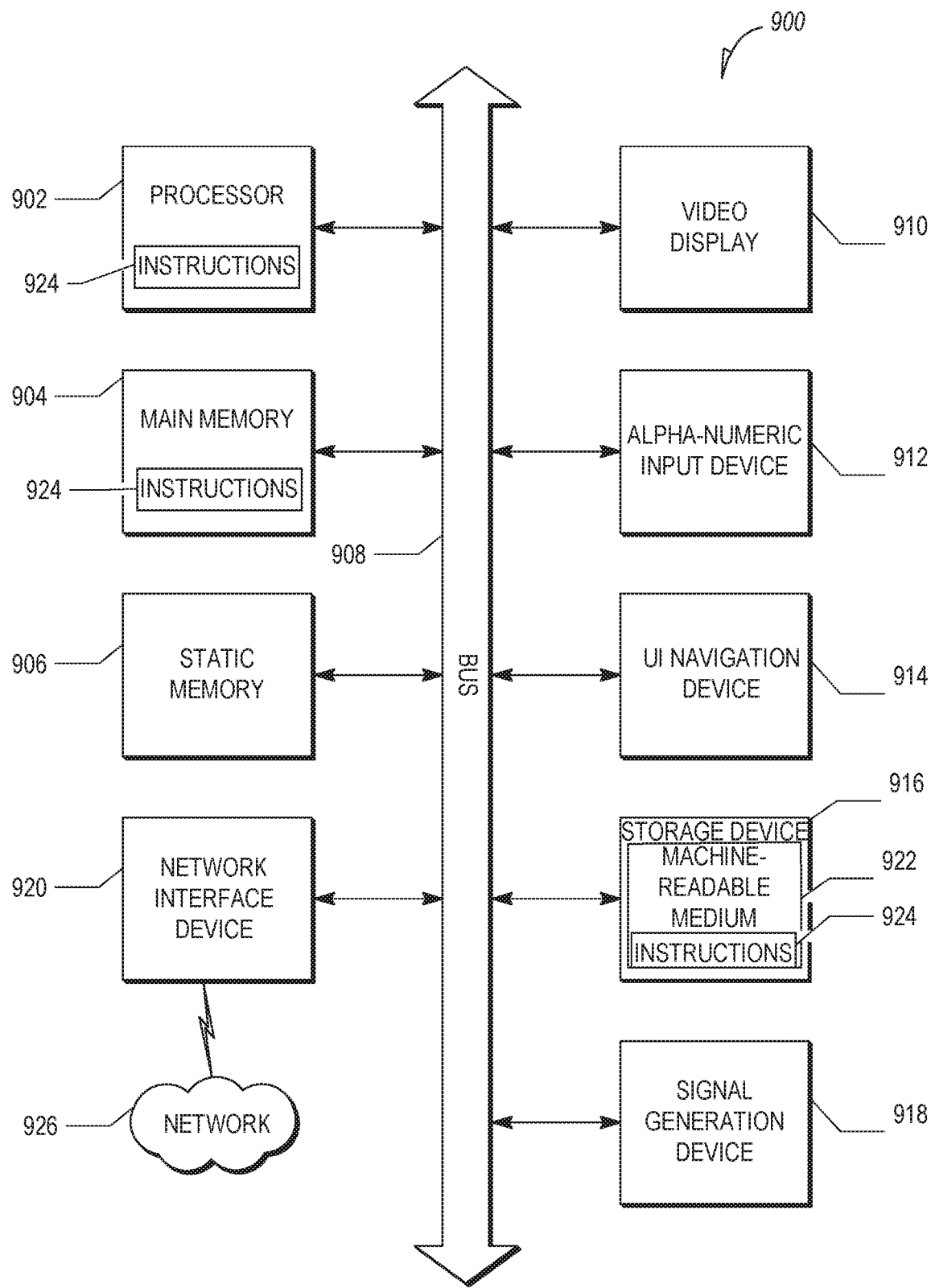
FIG. 9 is a block diagram illustrating a computing device hardware architecture, within which a set or sequence of instructions can be executed to cause a machine to perform examples of any one of the methodologies discussed herein.

FIG. 9 is a block diagram illustrating a computing device hardware architecture 900, within which a set or sequence of instructions can be executed to cause a machine to perform examples of any one of the methodologies discussed herein. The architecture 900 may describe, for example, any of the computing devices described herein. The architecture 900 may execute the software architecture 802 described with respect to FIG. 8. The architecture 900 may operate as a standalone device or may be connected (e.g., networked) to other machines. In a networked deployment, the architecture 900 may operate in the capacity of either a server or a client machine in server-client network environments, or it may act as a peer machine in peer-to-peer (or distributed) network environments. The architecture 900 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 900 includes a processor unit 902 comprising at least one processor (e.g., a central processing unit (CPU), a graphics processing unit (GPU), or both, processor cores, compute nodes, etc.). The architecture 900 may further comprise a main memory 904 and a static memory 906, which communicate with each other via a link 908 (e.g., bus). The architecture 900 can further include a video display unit 910, an alphanumeric input device 912 (e.g., a keyboard), and a UI navigation device 914 (e.g., a mouse). In some examples, the video display unit 910, alphanumeric input device 912, and UI navigation device 914 are incorporated into a touchscreen display. The architecture 900 may additionally include a storage device 916 (e.g., a drive unit), a signal generation device 918 (e.g., a speaker), a network interface device 920, and one or more sensors (not shown), such as a GPS sensor, compass, accelerometer, or other sensor.

In some examples, the processor unit 902 or another suitable hardware component may support a hardware interrupt. In response to a hardware interrupt, the processor unit 902 may pause its processing and execute an ISR, for example, as described herein.

The storage device 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904, within the static memory 906, and/or within the processor unit 902 during execution thereof by the architecture 900, with the main memory 904, the static memory 906, and the processor unit 902 also constituting machine-readable media. The instructions 924 stored at the machine-readable medium 922 may include, for example, instructions for implementing the software architecture 802, instructions for executing any of the features described herein, etc.

While the machine-readable medium 922 is illustrated in an example to be a single medium, the term "machine-readable medium" can include a single medium or multiple media (e.g., a centralized or distributed database, and/or associated caches and servers) that store the one or more instructions 924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

The invention claimed is:

1. A computerized system for providing a user interface at a plurality of computing devices, comprising:
   a processor unit; and
   a machine-readable medium in communication with the processor unit, wherein the machine-readable medium comprises instructions thereon that, when executed by the processor unit, causes the processor unit to execute operations comprising:
      executing a first interface application at a first computing device;
      determining, by the first interface application, a first state for a user interface;
      detecting, by the first interface application, a plurality of user computing devices for providing the user interface to a user;
      selecting, by the first interface application, a second computing device that is of the plurality of user computing devices, wherein the selecting is based at least in part on the second computing device supporting an implementation of the first state of the user interface, and wherein implementation of the first state of the user interface is unsupported for at least one unselected computing device of the plurality of user computing devices due to the at least one unselected computing device lacking a user interface output element to support at least a portion of the first state of the user interface;
      sending state data describing a state of the first interface application to a second interface application executing at the second computing device;
      determining, by the first interface application, a second state for the user interface;
      selecting, by the first interface application, a third computing device that is of the plurality of user computing devices, wherein the selecting is based at least in part on the second state of the user interface; and
      sending, by the first interface application, the description of the user interface to the third computing device.

2. The system of claim 1, wherein detecting the plurality of user computing devices comprises:
   sending, by the first interface application, a broadcast message via a communications network; and
   receiving, by the first interface application, a reply message from a second interface application executing at the second computing device.

3. The system of claim 1, wherein sending the state data comprises sending at least one user interface message to the second computing device via an application programming interface (API) of the second computing device, wherein the at least one user interface message comprises a description of a first user interface element to be provided at the second computing device.

4. The system of claim 3, wherein the machine-readable medium further comprises instructions thereon that, when executed by the processor unit, causes the processor unit to execute operations comprising receiving, by the first interface application, input data describing an input provided to the second computing device by the user in response to the user interface.

5. The system of claim 1, wherein the machine-readable medium further comprises instructions thereon that, when executed by the processor unit, causes the processor unit to execute operations comprising determining that the first state of the user interface comprises a visual output element, wherein selecting the second computing device is based at least in part on a size of the visual output element.

6. The system of claim 1, wherein the machine-readable medium further comprises instructions thereon that, when executed by the processor unit, causes the processor unit to execute operations comprising:
   determining that the first state of the user interface comprises an input prompt; and
   determining that the second computing device comprises an input device for receiving an input from the user.

7. The system of claim 1, wherein sending the description of the user interface to the second computing device comprises sending state data describing a state of the first interface application to a second interface application executing at the second computing device, wherein the machine-readable medium further comprises instructions thereon that, when executed by the processor unit, causes the processor unit to execute operations comprising:
   determining, by the second interface application, a second state for the user interface;
   selecting, by the second interface application, a fourth computing device that is of the plurality of user computing devices, wherein the selecting is based at least in part on the second state of the user interface; and
   sending, by the second interface application, a description of the user interface to the second computing device.

8. A method for providing a user interface at a plurality of computing devices, the method comprising:
   executing a first interface application at a first computing device;
   determining, by the first interface application, a first state for a user interface;
   detecting, by the first interface application, a plurality of user computing devices for providing the user interface to a user;
   selecting, by the first interface application, a second computing device that is of the plurality of user computing devices, wherein the selecting is based at least in part on the second computing device supporting an implementation of the first state of the user interface, and wherein implementation of the first state of the user interface is unsupported for at least one unselected computing device of the plurality of user computing devices due to the at least one unselected computing device lacking user interface output element to support at least a portion of the first state of the user interface;
   sending state data describing a state of the first interface application to a second interface application executing at the second computing device;

determining, by the first interface application, a second state for the user interface;

selecting, by the first interface application, a third computing device that is of the plurality of user computing devices, wherein the selecting is based at least in part on the second state of the user interface; and sending, by the first interface application, the description of the user interface to the third computing device.

9. The method of claim 8, wherein detecting the plurality of user computing devices comprises:

sending, by the first interface application, a broadcast message via a communications network; and receiving, by the first interface application, a reply message from a second interface application executing at the second computing device.

10. The method of claim 8, wherein sending the state data comprises sending at least one user interface message to the second computing device via an application programming interface (API) of the second computing device, wherein the at least one user interface message comprises a description of a first user interface element to be provided at the second computing device.

11. The method of claim 10, further comprising receiving, by the first interface application, input data describing an input provided to the second computing device by the user in response to the user interface.

12. The method of claim 8, further comprising determining that the first state of the user interface comprises a visual output element, wherein selecting the second computing device is based at least in part on a size of the visual output element.

13. The method of claim 8, further comprising:

determining that the first state of the user interface comprises an input prompt; and determining that the second computing device comprises an input device for receiving an input from the user.

14. A non-transitory machine-readable medium having instructions thereon that, when executed, by at least one processor unit, cause the at least one processor unit to perform operations comprising:

determining, by a first interface application, a first state for a user interface;

detecting, by the first interface application, a plurality of user computing devices for providing the user interface to a user;

selecting, by the first interface application, a computing device that is of the plurality of user computing devices, wherein the selecting is based at least in part on the second computing device supporting an implementation of the first state of the user interface, and wherein implementation of the first state of the user interface is unsupported for at least one unselected computing device of the plurality of user computing devices due to the at least one unselected computing device lacking user interface output element to support at least a portion of the first state of the user interface;

sending state data describing a state of the first interface application to a second interface application executing at the second computing device;

determining, by the first interface application, a second state for the user interface;

selecting, by the first interface application, a third computing device that is of the plurality of user computing devices, wherein the selecting is based at least in part on the second state of the user interface; and sending, by the first interface application, the description of the user interface to the third computing device.

15. The machine-readable medium of claim 14, wherein sending the state data comprises sending at least one user interface message to the second computing device via an application programming interface (API) of the second computing device, wherein the at least one user interface message comprises a description of a first user interface element to be provided at the second computing device.

16. The machine-readable medium of claim 14, wherein detecting the plurality of user computing devices comprises:

sending, by the first interface application, a broadcast message via a communications network; and receiving, by the first interface application, a reply message from a second interface application executing at the second computing device.

17. The machine-readable medium of claim 14, wherein the machine-readable medium further comprises instructions thereon that, when executed, by at least one processor unit, cause the at least one processor unit to perform operations comprising:

determining that the first state of the user interface comprises an input prompt; and determining that the second computing device comprises an input device for receiving an input from the user.

* * * * *